United States Patent [19]
Meyer et al.

[11] Patent Number: 5,611,577
[45] Date of Patent: Mar. 18, 1997

[54] BELLOWS SEALED BALL JOINT AND METHOD OF FORMING

[75] Inventors: Mark K. Meyer, Centerville; Michael R. Storage, Beavercreek; John R. Robison, Jamestown, all of Ohio

[73] Assignee: General Electric Company, Cincinnati, Ohio

[21] Appl. No.: 362,376

[22] Filed: Dec. 22, 1994

[51] Int. Cl.$^6$ .................................................. F16L 27/00
[52] U.S. Cl. ........................ 285/261; 285/226; 29/441.1
[58] Field of Search .................................. 285/261, 226, 285/299, 300, 301, 263, 227; 29/441.1

[56] References Cited

U.S. PATENT DOCUMENTS

| | | | |
|---|---|---|---|
| 1,099,220 | 6/1914 | Ward | 29/441.1 |
| 1,351,875 | 9/1920 | Schreiber | 285/226 |
| 1,821,274 | 9/1931 | Plummer | 285/261 |
| 1,868,696 | 7/1932 | Crary | 285/261 |
| 2,175,191 | 10/1939 | Goyette | 285/261 |
| 2,500,720 | 3/1950 | Van der Heem | 285/161 |
| 2,604,339 | 7/1952 | Kaysing et al. | 285/261 |
| 2,613,087 | 10/1952 | Alford | 285/92 |
| 2,910,308 | 10/1959 | Carr | 285/27 |
| 3,002,269 | 10/1961 | Hopkins | 285/261 |
| 3,219,365 | 11/1965 | Webb | 285/45 |
| 3,461,528 | 8/1969 | Diederichs | 29/441.1 |
| 3,695,645 | 10/1972 | Mommsen | 285/261 |
| 3,770,303 | 11/1973 | Hallett | 285/45 |
| 4,151,632 | 5/1979 | Green | 29/441.1 |
| 4,165,107 | 8/1979 | Aff et al. | 285/41 |
| 4,350,372 | 9/1982 | Logsdon | 285/45 |
| 4,508,373 | 4/1985 | Ward | 285/226 |
| 4,606,668 | 8/1986 | Schmidt | 29/441.1 |
| 4,643,463 | 2/1987 | Halling et al. | 285/226 |
| 4,856,822 | 8/1989 | Parker | 285/62 |
| 4,893,847 | 1/1990 | Hess | 285/226 |
| 5,286,071 | 2/1994 | Storage | 285/226 |

FOREIGN PATENT DOCUMENTS

| | | | |
|---|---|---|---|
| 137602 | 5/1948 | Australia | 285/226 |
| 609137 | 11/1960 | Canada | 285/226 |
| 413263 | 5/1925 | Germany . | |

OTHER PUBLICATIONS

Stainless Steel Products, Inc., "Low Bending Moment Ball Socket Joint," Bulletin No. 050188, 1988, 2 pages.
General Connectors, "Bellows Ball Joints," Technical Bulletin No. 1350, 4 pages.

*Primary Examiner*—Eric K. Nicholson
*Attorney, Agent, or Firm*—Andrew C. Hess; Nathan D. Herkamp

[57] ABSTRACT

A ball joint includes a tubular outer shroud having a unique one-piece weld-free socket which receives a complementary ball of a tubular inner shroud. The ball joint is preferably formed by plastically deforming the outer shroud to integrally form the socket around the ball. The socket may be formed around a preformed ball, or both the ball and socket may be integrally plastically formed simultaneously.

16 Claims, 3 Drawing Sheets

BELLOWS SEALED BALL JOINT AND METHOD OF FORMING

The present invention relates generally to aircraft engines, and, more specifically, to bellows sealed ball joints associated therewith.

BACKGROUND OF THE INVENTION

In a typical aircraft mounted gas turbine engine, ball-and-socket joints, or simply ball joints, are used for joining together fluid carrying conduits which require articulation therebetween. An integral bellows seal is provided inside the ball joints for preventing leakage of the fluid flow therethrough while allowing articulation of the ball joint itself.

Since the ball and socket are spherical for allowing articulation therebetween while holding together the two components thereof, they cannot be simply assembled together in their final form. Similarly, the large diameter convolutions of the bellows are typically located inside the spherical ball and socket, and therefore the bellows also cannot be simply assembled into the ball joint in its final form.

Accordingly, in order to assemble these three components of a typical ball joint, one conventional method requires that the outer spherical socket be initially formed as two halves or split so that the bellows and the ball may be initially assembled into the socket first half, with the socket second half being positioned over the ball and welded to the socket second half to complete the assembly. This assembly process is relatively complex, and the welding together of the two socket halves may cause undesirable distortion thereof, undesirable residual stresses therein, and an undesirable weld located in a highly stressed location of the unit.

In another conventional ball joint, the spherical socket is formed with axially extending locking tabs which are initially axially translated over complementary indentations in the outer surface of the ball which allows the ball and socket to be assembled together around a bellows therein. The ball and socket are then rotated relative to each other so that the socket tabs are positioned remotely from the ball indentations which prevents the unintended disassembly of the ball joint. This design also is relatively complex and requires the additional formation of the locking tabs and assembly indentations.

Summary of the Invention

A ball joint includes a tubular outer shroud having a one-piece socket which receives a complementary ball of a tubular inner shroud. The ball joint is preferably formed by plastically deforming the outer shroud to integrally form the socket around the ball. The socket may be formed around a preformed ball, or both the ball and socket may be integrally plastically formed simultaneously thereby eliminating the need for any welding in the socket.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
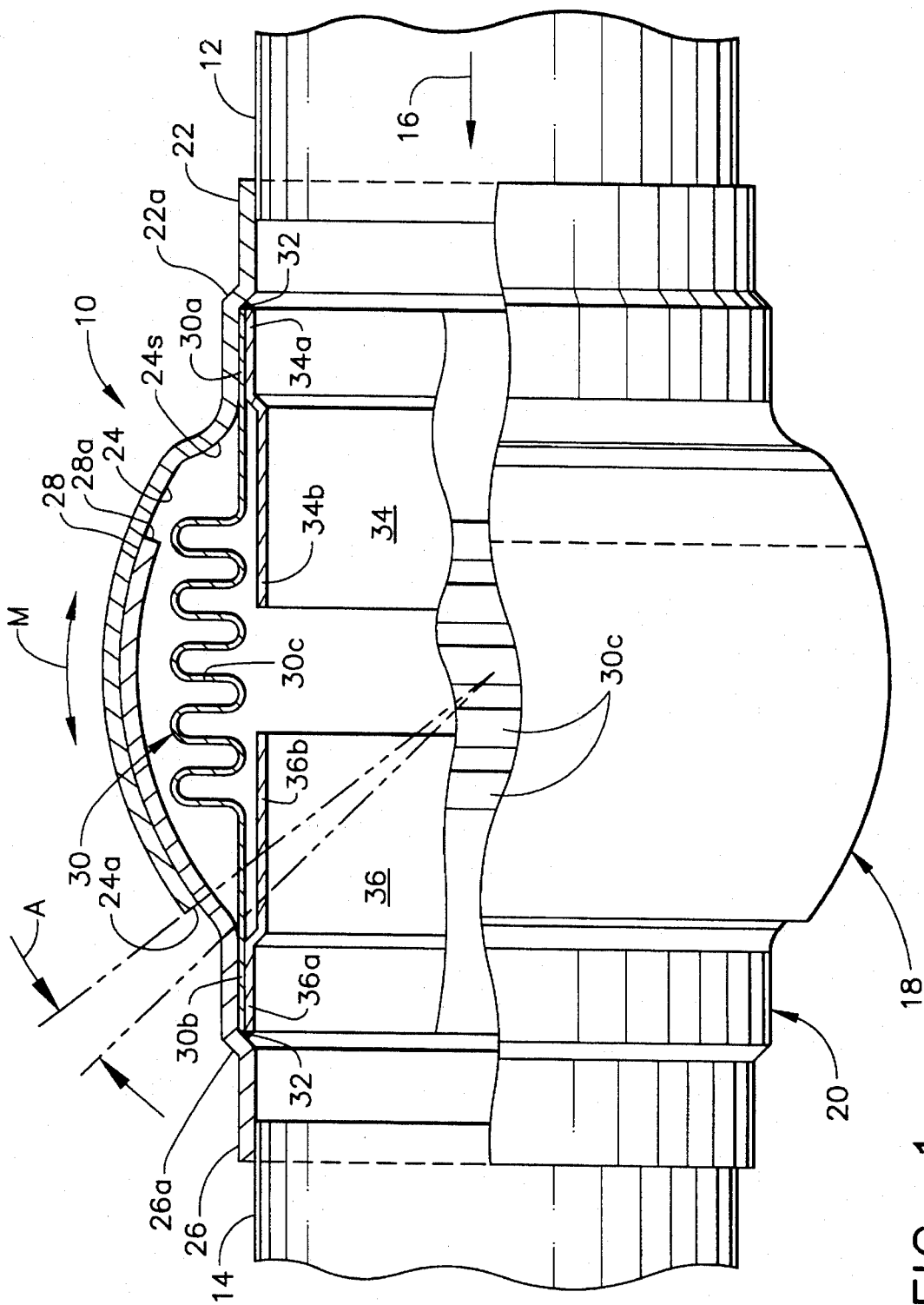
FIG. 1 is an elevational, partly sectional view of an exemplary ball joint in accordance with one embodiment of the present invention.

Illustrated in FIG. 1 is an exemplary embodiment of a ball-and-socket joint, or simply ball joint 10 for joining together in fluid flow communication a first tubular conduit 12 and a second tubular conduit 14. In the exemplary embodiment illustrated, the ball joint 10 is used for carrying flow of a fluid 16, such as compressor bleed air, fuel, or oil, in an aircraft gas turbine engine or between the engine and an aircraft in which the engine is mounted, or in the aircraft itself. The ball joint 10 is specifically configured for preventing leakage of the fluid 16 while allowing pivotal or articulated movement M between the first and second conduits 12, 14 as desired. The motion results in lower stresses in the conduits 12 and 14, thus allowing them to be produced from lighter weight and lower cost materials.

The ball joint 10 includes a tubular outer fitting or shroud 18 which surrounds in part a coaxial tubular inner fitting or shroud 20 for allowing the pivotal movement M therebetween. The outer shroud 18 is one piece and includes at a proximal end thereof an integral first cylindrical sleeve 22 for being fixedly joined to the first conduit 12 by conventional welding for example, and at a distal end thereof includes an integral spherical, concave annulus defining a unique one-piece weld-free socket 24 around the inner surface thereof.

The inner shroud 20 is also one piece and includes at a proximal end thereof an integral second cylindrical sleeve 26 for being fixedly joined to the second conduit 14 by welding for example, and includes at a distal end thereof an integral spherical, convex annulus defining a smooth ball 28 around its outer surface which is complementary with the socket 24. The outer diameter of the ball 28 is nominally equal to the inner diameter of the socket 24, with the ball 28 being disposed in abutting, slidable contact with the socket 24 for holding or joining together the outer and inner shrouds 18, 20 while allowing a predetermined amount of pivoting angular movement M therebetween. A suitable coating may be applied on the ball 28 for reducing friction and reducing bending moment.

Both the outer and inner shrouds 18, 20 may be formed from conventional, thin wall tubing having generally smooth surfaces. Both the ball 28 and the socket 24 are preferably axially and circumferentially continuous or smooth without indentations, tabs, holes, etc. However, such additional features may be used for reducing weight if desired. Each of the ball 28 and socket 24 is an annulus portion of a sphere defined between axially spaced apart parallel planes with the convex outer surface of the ball 28 being smooth and uninterrupted between its two axial end planes, and the concave inner surface of the socket 24 also being smooth and uninterrupted between its opposite end planes.

Since the adjoining ball 28 and socket 24 are not leak proof by themselves, a tubular bellows 30 is disposed coaxially inside the adjoining outer and inner shrouds 18, 20 for sealingly joining together the first and second conduits 12, 14 while allowing the limited pivotal movement M therebetween. The bellows 30 includes a first end 30a sealingly joined by resistance welding for example to the inner surface of the outer shroud 18 adjacent to the first sleeve 22. The bellows 30 includes a second, opposite end 30b similarly sealingly joined by resistance welding for example to the inner surface of the inner shroud 20 adjacent to the second sleeve 26. The bellows 30 also includes a plurality of axially spaced apart convolutions 30c between the first and second ends 30a,b which provide a flexible seal between the outer and inner shrouds 18, 20 for preventing leakage of the fluid 16 from the first and second conduits 12, 14 and into the engaged or cooperating ball 28 and socket 24 while allowing the pivotal movement M therebetween. The bellows 30 is formed of a suitable thin metal stock which may be conveniently resistance welded to the metallic outer and inner shrouds 18, 20 forming suitable end welds 32 thereat.

As shown in FIG. 1, the socket 24 has a distal edge 24a predeterminedly spaced along the ball 28 from its joint with the second sleeve 26 for limiting the pivoting movement M between the ball 28 and the socket 24 to a maximum pivoting angle A. The pivoting movement M is limited by contact between the socket distal edge 24a and the second sleeve 26 where it joins the ball 28. In this way, the ball 28 and socket 24 which hold together the outer and inner shrouds 18, 20 also allow limited flexing of the bellows 30 disposed inside the ball 28 and socket 24 for preventing undesirable overtravel of the bellows 30. Similar features may be employed if desired on the other end of the unit, with the ball 28 having a distal edge 28a predeterminedly spaced from a step 24s formed at the proximal end of the socket 24. The maximum pivoting angle A may be selected as desired, but in this exemplary embodiment is less than about 10° and is preferably about 5°.

Referring again to FIG. 1, the first sleeve 22 preferably includes a first annular or cylindrical inside step 22a for predeterminedly seating the bellows first end 30a. Similarly, the second sleeve 26 includes a second annular or cylindrical inside step 26a for predeterminedly seating the bellows second end 30b. In this way, the outer diameter of the bellows first and second ends 30a,b may be made generally equal to the inner diameter of the respective first and second cylindrical steps 22a, 26a for conveniently and accurately trapping the bellows 30 in its proper position within the outer and inner shrouds 18, 20 prior to welding thereof.

In order to reduce pressure losses and/or flow induced vibration due to flow of the fluid 16 along the inner surface of the undulating bellows 30, a first tubular liner 34 is disposed inside the bellows 30 and has a first, proximal end 34a fixedly joined by welding for example to the first sleeve 22 adjacent to the bellows first end 30a. Similarly, a second tubular liner 36 is also disposed inside the bellows 30 and has a first, proximal end 36a fixedly joined by welding for example to the second sleeve 26 adjacent to the bellows second end 30b. The second liner 36 has an opposite, second distal end 36b which is disposed adjacent to and spaced from a corresponding second distal end 34b of the first liner 34. In a preferred embodiment, the first and second liner first ends 34a, 36a are also seated in the respective first and second steps 22a, 26a along with the bellows first and second ends 30a,b. The seam weld 32 may then be formed for simultaneously sealingly welding the respective opposite ends of the bellows 30 and liners 34, 36 to the respective first and second sleeves 22, 26 in the steps 22a, 26a thereof.

The complete ball joint 10 therefore provides articulation between the ball 28 and the socket 24, with the bellows 30 preventing leakage. The liners 34, 36 provide a relatively smooth surface along which the flow 16 may travel for reducing pressure losses and/or likelihood of flow induced vibrations therein. The outer surfaces of the liners 34, 36 are suitably spaced below the bellows convolutions 30c for preventing rubbing contact therebetween while allowing the bellows 30 to pivot for accommodating misalignment between the conduits 12, 14. In an alternate embodiment (not shown), the socket 24 may include at its proximal end, a cylindrical section for allowing limited axial sliding movement between the ball 28 and the socket 24 in addition to the pivoting movement M if desired.

Figure 2:
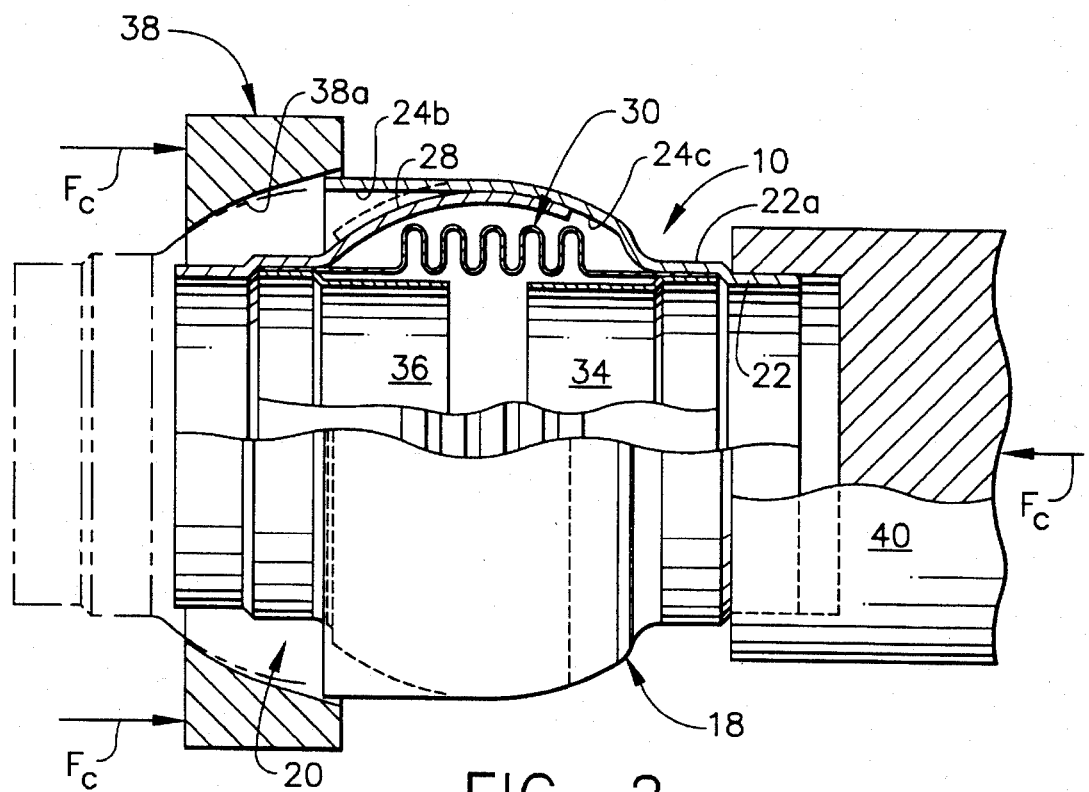
FIG. 2 is a schematic representation of one method for forming the ball joint illustrated in FIG. 1 in which an outer shroud of the ball joint is plastically deformed around a preformed ball.

Since each of the ball 28 and socket 24 is a one-piece, continuous component which differentiates it from all other known designs, a suitable method for forming the ball joint 20 is required which does not involve cutting or welding any of the components thereof. Accordingly, FIG. 2 illustrates schematically one exemplary method of forming the ball joint 10 illustrated in FIG. 1. In this embodiment, the ball 28 is conventionally preformed at the distal end of the inner shroud 20, with the distal end of the outer shroud 18 being conventionally preformed with a socket cylindrical portion 24b being sized for receiving the ball 28 against a socket spherical portion 24c against which the ball 28 is axially positionable. The inner diameter of the socket cylindrical portion 24b is slightly larger than the outer diameter of the preformed ball 28 so that the ball 28 may be axially translated into position against the socket spherical portion 24c. During assembly, the bellows 30, which is preformed, is axially translated into position into the first step 22a of the first sleeve 22 followed in turn by correspondingly positioning the first liner 34 therein. The second liner 36 is then suitably axially inserted inside the bellows 30. This is followed in turn by inserting the ball 28 into the socket cylindrical portion 24b in abutment against the spherical portion 24c for completing the initial assembly of the components. The forming process continues by suitably plastically deforming the socket cylindrical portion 24b around the ball 28 to complete the final socket 24 disposed therearound. The seam welds 32 may then be conventionally formed resulting in the final, completed ball joint illustrated in FIG. 1.

In the exemplary embodiment illustrated in FIG. 2, the socket cylindrical portion 24b is preferably cold formed using an annular first anvil 38 having a concave inner contour 38a which is complementary to the desired convex outer surface of the distal end of the socket 24 for forming the required concave inner surface thereof. A suitable holding fixture 40 supports the outer shroud 18 at the first sleeve 22 thereof and suitable compressive force $F_c$ is applied axially between the fixture 40 and the anvil 38 to plastically bend the socket cylindrical portion 24b into its final spherical configuration to trap inside the ball 28, bellows 30, and liners 34, 36.

Axially forming the socket cylindrical portion 24b into its final spherical configuration, which is referred to also as wiping, is merely one manner of plastically forming the socket 24 around the ball 28. In another, related process (not shown), a suitable roller may be pressed around the circumference of the socket cylindrical portion 24b to correspondingly plastically contract the socket cylindrical portion 24b into its final spherical configuration, which is commonly called "spinning."

Figure 3:
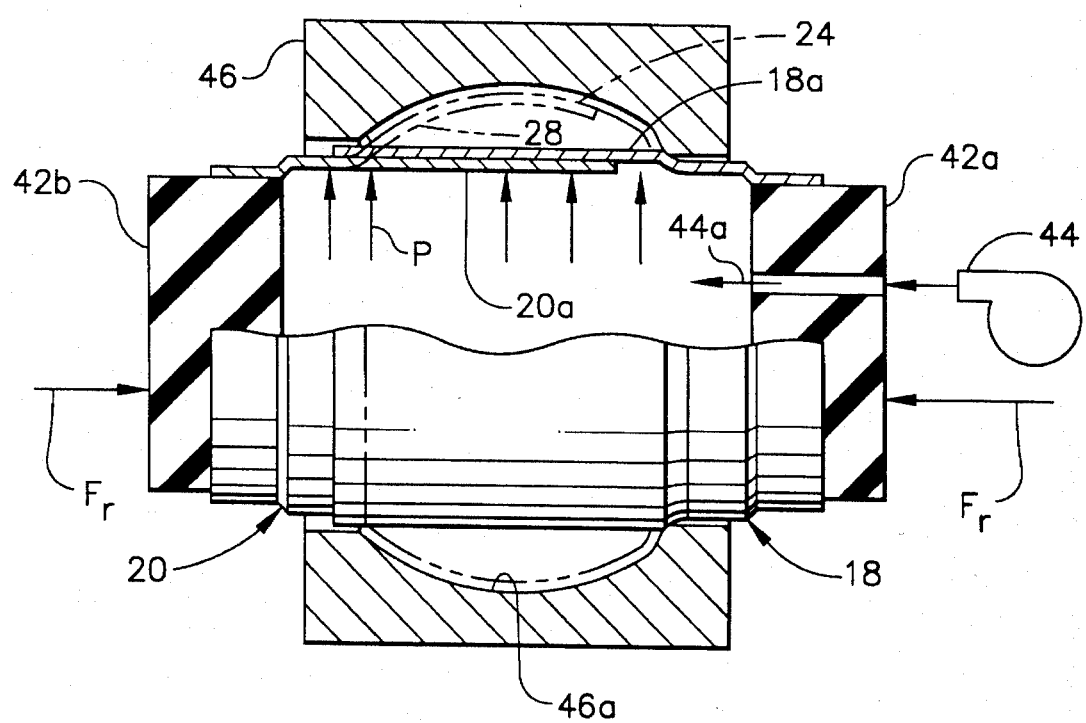
FIG. 3 is a schematic representation of an alternate embodiment of forming the ball joint illustrated in FIG. 1 in which both the ball and socket are simultaneously formed together by pressurizing the inside of the ball joint with a pressurizing fluid.

Illustrated schematically in FIG. 3 is another method for integrally forming the ball 28 and the socket 24. In this embodiment, both the outer and inner shrouds 18, 20 have substantially cylindrical distal ends 18a, 20a in conventional tubing form, with the inner shroud distal end 20a being disposed in a suitably close fit in abutting contact inside the outer shroud distal end 18a. By suitably pressurizing inside the inner shroud distal end 20a, both distal ends 18a, 20a of the outer and inner shrouds 18, 20 may be simultaneously plastically deformed into the corresponding socket 24 and ball 28. In the exemplary embodiment illustrated in FIG. 3, the initially interfitted shrouds 18, 20 are provided with suitable endcaps 42a,b to seal the respective ends thereof. The first endcap 42a is suitably disposed in flow communication with a conventional hydraulic pump 44 which supplies a hydraulic fluid 44a under a suitable pressure P inside the shrouds 18, 20. An annular second anvil 46 coaxially surrounds the shrouds 18, 20 and includes a concave, spherical inner contour 46a which is complementary with the desired convex, spherical outer contour of the socket 24. Accordingly, pressurizing the inside of the shrouds 18, 20 causes the initially cylindrical distal ends 18a, 20a thereof to plastically deform or bulge radially outwardly until they are restrained by the inner contour 46a of the second anvil 46. Suitable reaction force $F_r$ is applied to the endcaps 42a,b to prevent their unintended ejection during the pressurizing process.

Figure 4:
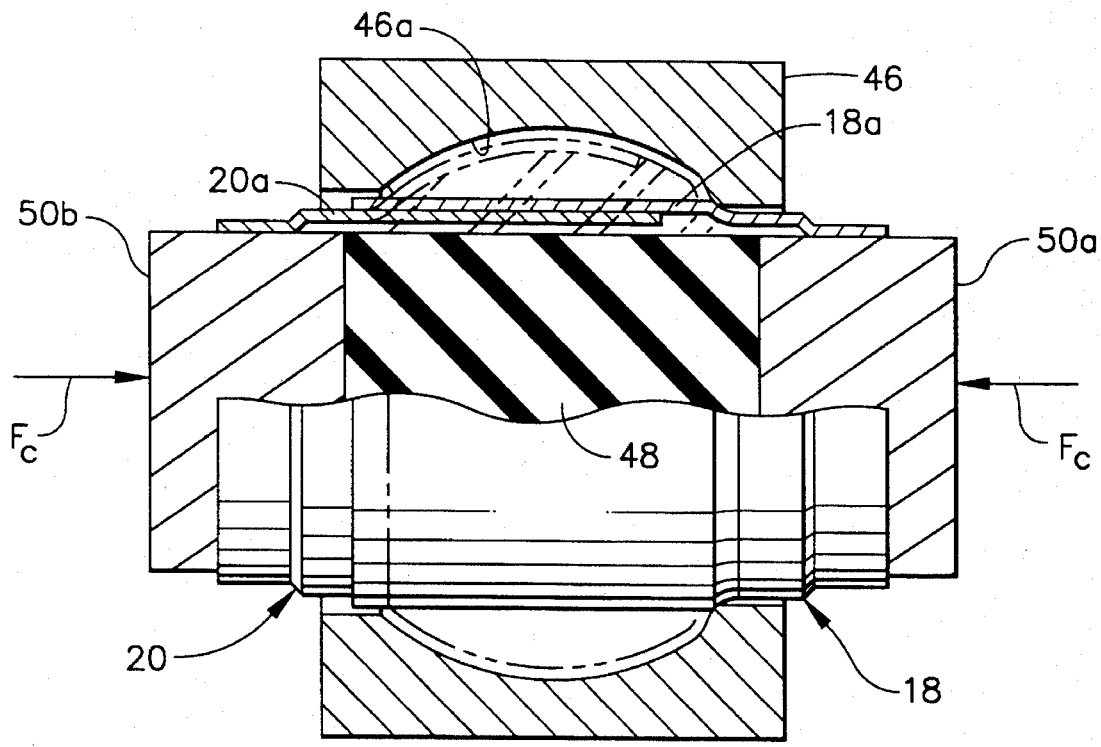
FIG. 4 is a schematic representation of another method of forming the ball joint illustrated in FIG. 1 in which the ball and socket are both simultaneously formed together by pressurizing the inside of the ball joint by compressing an elastomeric cylinder therein.

Illustrated schematically in FIG. 4 is another method for integrally forming the ball 28 and socket 24 which is substantially identical to the method disclosed in FIG. 3, except that the pressurizing force is instead generated by suitably axially compressing an elastomeric or rubber cylinder 48 between two opposing pistons 50a,b. As the cylinder 48 is compressed, it bulges around its outer perimeter for correspondingly plastically deforming radially outwardly the cylindrical distal ends 18a, 20a against the inner contour 46a of the second anvil 46 to simultaneously form the ball 28 and socket 24.

Figure 5:
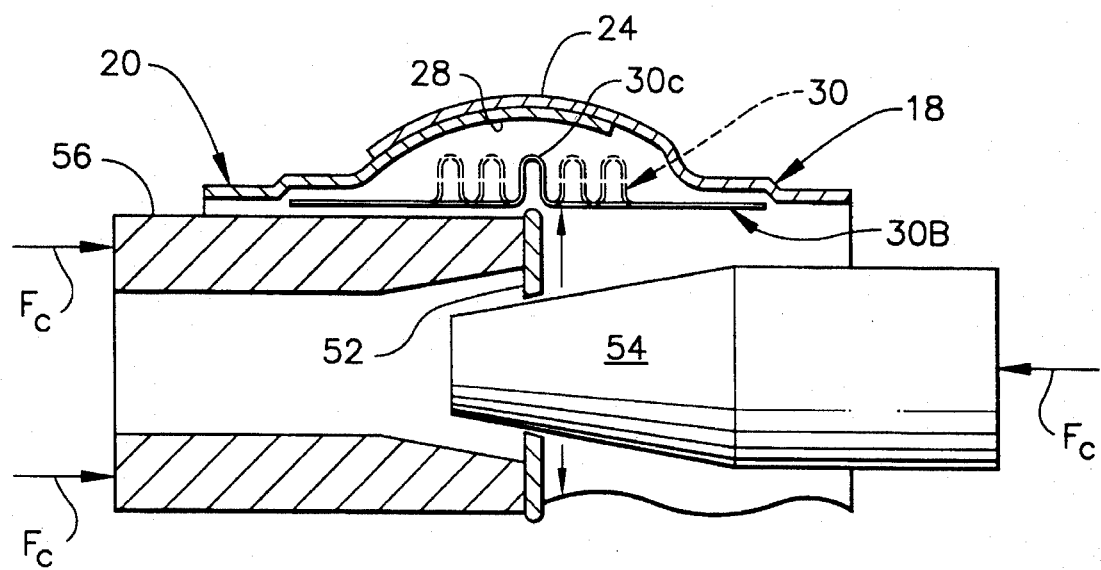
FIG. 5 is a schematic representation for forming a bellows inside either of the ball joints illustrated in FIGS. 3 and 4.

After the socket 24 and ball 28 are formed in the respective outer and inner shrouds 18, 20 through either of the methods associated with FIGS. 3 and 4, the bellows 30 may then be formed inside thereof. More specifically, FIG. 5 illustrates schematically the additional step of inserting into the adjoining outer and inner shrouds 18, 20 a cylindrical, smooth bellows blank 30B. The individual bellows convolutions 30c are then sequentially formed from inside the bellows blank 30B to form the resulting fully convoluted bellows 30 inside the ball 28 and the socket 24. In this method, a metallic disk wedge 52 is positioned coaxially inside the bellows blank 30B. The disk wedge 52 includes a suitable number of pie-shaped segments around its circumference which allow it to expand radially outwardly. The wedge 52 includes a central bore through which may be axially translated a conical cam 54 from one side thereof, with the opposite side of the wedge 52 being suitably restrained by a tubular support 56. In this way, a compressive load $F_c$ may be applied axially between the cam 54 and the support 56 so that the cam 54 urges radially outwardly the disk wedge 52 to form an individual, generally U-shaped convolution 30c in the thin wall of the bellows blank 30B. The wedge 52 is suitably retracted and axially moved or indexed to sequentially form all of the remaining convolutions 30c. If desired, the liners 34, 36 illustrated in FIGS. 1 and 2 may also be formed inside the bellows 30 formed in FIG. 5 by being suitably expanded into position therein.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

We claim:

1. A ball joint comprising:

a one-piece tubular outer shroud having at a proximal end thereof an integral first sleeve for being fixedly joined to a first conduit, and at a distal end thereof an integral, spherical, and concave annulus defining a one-piece socket;

a one-piece tubular inner shroud having at a proximal end thereof an internal second sleeve for being fixedly joined to a second conduit, and at a distal end thereof an integral, spherical, and convex annulus defining a smooth ball being complementary with said socket and disposed in butting, slidable contact therewith for joining together said outer and inner shrouds while allowing pivoting movement therebetween; and a tubular bellows disposed coaxially inside said ball and socket, and including a first end sealingly joined to said outer shroud adjacent to said first sleeve, and a second, opposite end sealingly joined to said inner shroud adjacent to said second sleeve, with said bellows providing a flexible seal between said outer and inner shrouds for preventing leakage of fluid flow therethrough into said cooperating ball and socket while allowing pivotal movement therebetween.

2. A ball joint according to claim 1 wherein both said ball and socket are axially and circumferentially continuous.

3. A ball joint according to claim 2 wherein said socket has a distal edge predeterminedly spaced along said ball from said second sleeve for limiting pivoting movement between said ball and socket upon contact between said socket distal edge and said second sleeve, and thereby limiting of said bellows disposed inside said ball and socket.

4. A ball joint according to claim 3 wherein:

said first sleeve of said outer shroud includes a first annular step for predeterminedly seating said bellows first end; and said second sleeve of said inner shroud includes a second annular step for predeterminedly seating said bellows second end.

5. A ball joint according to claim 4 further comprising:

a first tubular liner disposed inside said bellows and having a first end fixedly joined to said first sleeve adjacent to said bellows first end, and further having an opposite second end; and a second tubular liner disposed inside said bellows and having a first end fixedly joined to said second sleeve adjacent to said bellows second end, and further having an opposite second end disposed adjacent to and spaced from said first liner second end.

6. A method for forming a ball joint from tubular outer and inner shrouds comprising:

inserting a distal end of said inner shroud into a distal end of said outer shroud;

plastically deforming at least one of said inner and outer shroud distal ends to form said ball joint having said outer shroud distal end including a spherical, concave annulus defining a socket in abutting, slidable contact around a spherical, convex annulus defining a complementary ball at said inner shroud distal end;

inserting into said adjoining outer and inner shrouds a cylindrical bellows blank; and sequentially forming individual bellows convolutions from inside said bellows blank to form a bellows inside said ball and socket.

7. A method according to claim 6 wherein said ball is preformed at said inner shroud distal end, and said outer shroud distal end is preformed with a cylindrical portion sized for axially receiving said ball, and with a spherical portion against which said ball is positionable, and said method further comprises:

inserting said ball into said cylindrical portion in abutment against said spherical portion; and plastically deforming said cylindrical portion around said ball to complete said socket disposed therearound.

8. A method according to claim 6 wherein both said outer and inner shrouds are initially substantially cylindrical, with said inner shroud distal end being in abutting contact inside said outer shroud distal end, and said method further comprises:

pressurizing inside said inner shroud distal end to simultaneously plastically deform both said distal ends of said outer and inner shrouds into said corresponding socket and ball.

9. A ball joint according to claim 1 wherein said socket has a distal edge disposed along said ball adjacent to said second sleeve, and said ball has a distal edge disposed along said socket adjacent to said first sleeve, with said ball and socket being spaced radially outwardly from said first and second sleeves.

10. A ball joint according to claim 1 wherein said first and second sleeves extend coaxially oppositely from said ball and socket, and said ball and socket are tri-axially symmetrical therebetween.

11. A ball joint according to claim 1 wherein said first and second sleeves are coaxial and diametrically smaller than said ball and socket.

12. A ball joint according to claim 11 wherein said tubular bellows is disposed axially between said first and second sleeves, and has convolutions extending radially above said first and second sleeves and radially below said ball and socket.

13. A method for forming the ball joint of claim 1 comprising:

inserting a distal end of an inner shroud into a distal end of an outer shroud; and plastically deforming at least one of said inner and outer shroud distal ends to form said ball and socket joint having said outer shroud distal end including a spherical, concave annulus defining a socket in abutting, slidable contact around a spherical, convex annulus defining a complementary ball at said inner shroud distal end.

14. A method according to claim 13 wherein said ball is preformed at said inner shroud distal end, and said outer shroud distal end is preformed with a cylindrical portion sized for axially receiving said ball, and with a spherical portion against which said ball is positionable, and said method further comprises:

inserting said ball into said cylindrical portion in abutment against said spherical portion; and plastically deforming said cylindrical portion around said ball to complete said socket disposed therearound.

15. A method according to claim 13 wherein both said outer and inner shrouds are initially substantially cylindrical, with said inner shroud distal end being in abutting contact inside said outer shroud distal end, and said method further comprises:

pressurizing inside said inner shroud distal end to simultaneously plastically deform both said distal ends of said outer and inner shrouds into said corresponding socket and ball.

16. A method according to claim 13 further comprising:

inserting into said adjoining outer and inner shrouds a cylindrical bellows blank; and sequentially forming individual bellows convolutions from inside said bellows blank to form a bellows inside said ball and socket.

* * * * *